US010627944B2

(12) United States Patent
Wei

(10) Patent No.: US 10,627,944 B2
(45) Date of Patent: Apr. 21, 2020

(54) STEREOSCOPIC TOUCH PANEL AND TOUCH SENSING METHOD

(71) Applicants: AU Optronics (Suzhou) Corp., Ltd., Suzhou (CN); Au Optronics Corporation, Hsinchu (TW)

(72) Inventor: Guangdong Wei, Jiangsu Province (CN)

(73) Assignees: AU Optronics (Suzhou) Corp., Ltd, Suzhou (CN); AU Optronics Corporation, Hsinchu (TW)

(*) Notice: Subject to any disclaimer, the term of this patent is extended or adjusted under 35 U.S.C. 154(b) by 2 days.

(21) Appl. No.: 16/197,367

(22) Filed: Nov. 21, 2018

(65) Prior Publication Data
US 2019/0163303 A1 May 30, 2019

(30) Foreign Application Priority Data
Nov. 28, 2017 (CN) .......................... 2017 1 1213136

(51) Int. Cl.
G06F 3/041 (2006.01)
H04N 13/30 (2018.01)
G06F 3/044 (2006.01)

(52) U.S. Cl.
CPC .......... G06F 3/0412 (2013.01); G06F 3/0416 (2013.01); G06F 3/0446 (2019.05); H04N 13/30 (2018.05); G06F 2203/04103 (2013.01)

(58) Field of Classification Search
CPC .... G06F 3/0412; G06F 3/0446; G06F 3/0416; G06F 2203/04103; G06F 3/044; G06F 2203/04104; G06F 2203/04111; H04N 13/30
See application file for complete search history.

(56) References Cited

U.S. PATENT DOCUMENTS

| | | | |
|---|---|---|---|
| 6,433,781 B1 * | 8/2002 | Oda | G06F 3/0346 345/156 |
| 7,786,981 B2 | 8/2010 | Proctor | |
| 8,194,035 B2 * | 6/2012 | Yoshikawa | G06F 3/044 178/18.01 |
| 8,654,215 B2 * | 2/2014 | Sutton | H01L 27/14605 348/240.2 |
| 8,754,983 B2 * | 6/2014 | Sutton | H04N 5/3696 348/294 |
| 9,797,722 B1 * | 10/2017 | Ky | G01C 9/06 |
| 10,345,960 B2 * | 7/2019 | Hardie-Bick | G06F 3/011 |
| 10,437,380 B2 * | 10/2019 | Wei | G06F 3/0416 |

(Continued)

Primary Examiner — Rodney Amadiz
(74) Attorney, Agent, or Firm — JCIPRNET

(57) ABSTRACT

A stereoscopic touch panel including a substrate, M dextrorotatory lines and N levorotatory lines is provided. The substrate has a spherical surface including a non-operation region. A polar axis of the spherical surface passes through the non-operation region to define a pole. Each of the M dextrorotatory lines is disposed on the spherical surface and extends from the non-operation region in a direction leaving the pole and rotates a dextrorotatory angle with respect to a meridian direction of the spherical surface. Each of N levorotatory lines is disposed on the spherical surface and extends from the non-operation region in a direction leaving the pole and rotates a levorotatory angle with respect to the meridian direction of the spherical surface. A touch sensing method is also provided.

17 Claims, 6 Drawing Sheets

(56) References Cited

U.S. PATENT DOCUMENTS

| | | | |
|---|---|---|---|
| 2011/0031041 A1* | 2/2011 | Bulea | G06F 3/044 |
| | | | 178/18.06 |
| 2012/0159996 A1* | 6/2012 | Sutton | G03B 17/00 |
| | | | 65/406 |
| 2012/0242882 A1* | 9/2012 | Sutton | H01L 27/14605 |
| | | | 348/340 |
| 2013/0147743 A1 | 6/2013 | Ludwig | |
| 2015/0189140 A1* | 7/2015 | Sutton | H04N 5/2257 |
| | | | 348/208.1 |
| 2015/0234527 A1* | 8/2015 | Roberts | G06F 3/0416 |
| | | | 345/174 |
| 2015/0242028 A1* | 8/2015 | Roberts | G06F 3/0416 |
| | | | 345/173 |
| 2016/0021303 A1* | 1/2016 | Sutton | H04N 5/2257 |
| | | | 348/222.1 |
| 2018/0130243 A1* | 5/2018 | Kim | G06T 11/60 |
| 2019/0243478 A1* | 8/2019 | Wei | G06F 3/041 |
| 2019/0355282 A1* | 11/2019 | Potts | G06F 3/03545 |

* cited by examiner

STEREOSCOPIC TOUCH PANEL AND TOUCH SENSING METHOD

CROSS-REFERENCE TO RELATED APPLICATION

This application claims the priority benefit of China application serial no. 201711213136.0, filed on Nov. 28, 2017. The entirety of the above-mentioned patent application is hereby incorporated by reference herein and made a part of this specification.

BACKGROUND OF THE INVENTION

1. Field of the Invention

The invention relates to a stereoscopic touch panel, and particularly relates to a stereoscopic touch panel having a spherical surface.

2. Description of Related Art

Spherical displays are display apparatuses newly emerging in recent years. When providing high-resolution images and a multi-touch interactive function, the spherical displays are able to bring fresh vision experiences and enjoyment to users. An interactive system based on the spherical display is a brand new multi-touch application and allows 360-degree interaction between the user and a spherical screen. Conventional spherical displays mostly adopt the Fourier-transfer infrared (FTIR) touch technology. However, such technology requires an additional light source and an additional camera or light sensor to sense a variation of an infrared light field after a touch. Therefore, the spherical display is only applicable to display images through projection in order not to interfere with the light field for touch sensing. Besides, if wires are arranged along meridians and parallels on a surface of the spherical display to sense a touch, a space needs to be preserved to arrange a great number of parallel wires connected to a driving circuit. Therefore, the area of a sensing region is limited.

SUMMARY OF THE INVENTION

One or some exemplary embodiments of the invention provide a stereoscopic touch panel. A wiring method is adopted in the stereoscopic touch panel, such that lead wires that pass out signals are not required inside a sensing area. Therefore, a manufacturing process is simplified, and an effective sensing area is not limited.

A stereoscopic touch panel according to an embodiment of the invention includes a substrate, M dextrorotatory lines, and N levorotatory lines. The substrate has a spherical surface including a non-operation region. A polar axis of the spherical surface passes through the non-operation region to define a pole. The M dextrorotatory lines are disposed on the spherical surface. Each of the dextrorotatory lines extends from the non-operation region in a direction leaving the pole and rotates a dextrorotatory angle with respect to a meridian direction of the spherical surface, and each of the dextrorotatory lines is deviated a longitude of $(2\pi)/M$ degrees with respect to the adjacent dextrorotatory line, and M is a positive integer greater than 1. The N levorotatory lines are disposed on the spherical surface. Each of the levorotatory lines extends from the non-operation region in the direction leaving the pole and rotates a levorotatory angle with respect to the meridian direction of the spherical surface, and each of the levorotatory lines is deviated a longitude of $(2\pi)/N$ degrees with respect to the adjacent levorotatory line, and N is a positive integer greater than 1.

According to an embodiment of the invention, a range of a longitude that each of the dextrorotatory lines extends on the spherical surface is less than or equal to 180 degrees.

According to an embodiment of the invention, a range of a longitude that each of the levorotatory lines extends on the spherical surface is less than or equal to 180 degrees.

According to an embodiment of the invention, the number of an intersecting point where each of the levorotatory lines intersects any of the dextrorotatory lines is less than or equal to 1.

According to an embodiment, regarding a meridian passing through an intersecting point where one of the dextrorotatory lines intersects one of the levorotatory lines, a dextrorotatory angle is included between the dextrorotatory line and the meridian, a levorotatory angle is included between the levorotatory line and the meridian, and the dextrorotatory angle is equal to the levorotatory line.

According to an embodiment of the invention, the number M of the dextrorotatory lines M is equal to the number N of the levorotatory lines N.

According to an embodiment of the invention, the spherical surface is a surface of a complete sphere.

According to an embodiment of the invention, each of the levorotatory lines intersects all the dextrorotatory lines, and each of the levorotatory lines has a single intersecting point with each of the dextrorotatory lines.

According to an embodiment of the invention, the spherical surface is a surface of a portion of a sphere, each of the levorotatory lines intersects less than M dextrorotatory lines, and the polar axis passes through a surface defined by an edge contour of the surface of the portion of the sphere.

According to an embodiment of the invention, among a plurality of intersecting points where the levorotatory lines intersect the dextrorotatory lines, intersecting points closest to the non-operation region are located on a starting parallel.

According to an embodiment of the invention, one of the dextrorotatory lines is chosen as a $0^{th}$ dextrorotatory line, and the dextrorotatory lines are sequentially numbered from the $0^{th}$ dextrorotatory line in a predetermined direction, and one of the levorotatory lines intersecting the $0^{th}$ dextrorotatory line at the starting parallel is chosen as a $0^{th}$ levorotatory line and the levorotatory lines are sequentially numbered from the $0^{th}$ levorotatory line in the predetermined direction. When a longitude of an intersecting point passing through the $0^{th}$ dextrorotatory line intersects the $0^{th}$ levorotatory line is set as 0 degrees, and the longitude increases along the predetermined direction, a longitude coordinate of an intersecting point where a $m^{th}$ dextrorotatory line intersects a $n^{th}$ levorotatory line is $MOD((m+n+a)/Q,2)*\pi$, and a latitude coordinate of the intersecting point is $MOD((m-n+Q)/Q,1)*\pi+\Delta 1st$, wherein:

when $0 \leq m < n$, $a=Q$;
when $n \leq m \leq Q-1$, $a=0$;
m ranges from 1 to M;
n ranges from 1 to N;
$\Delta 1st$ is an included angle between a radius of an arbitrary point on the starting parallel and the polar axis, and
Q is M or N.

According to an embodiment of the invention, the predetermined direction is a counterclockwise direction.

According to an embodiment of the invention, the stereoscopic touch panel further includes a plurality of bonding lead wires in the non-operation region. The bonding lead wires are respectively connected with the dextrorotatory lines and the levorotatory lines, and the bonding lead wires are collectively arranged in a bonding region in the non-operation region to be electrically connected with a driving circuit device.

An embodiment of the invention further provides a touch sensing method as follows. The stereoscopic touch panel is provided. Among a plurality of intersecting points where the levorotatory lines intersect the dextrorotatory lines, intersecting points closest to the non-operation region are located on a starting parallel. A scan signal is sequentially applied to the M dextrorotatory lines or the N levorotatory lines. A sensing signal is read by all the levorotatory lines when the scan signal is applied to the dextrorotatory line, or the sensing signal is read by all the dextrorotatory lines when the scan signal is applied to the levorotatory line.

Based on the above, the stereoscopic touch panel according to the embodiments of the invention is capable of capacitive multi-point touch sensing. In addition, all the wires extend from the same region and the wires may substantially fully cover the surface of the stereoscopic touch panel without lead wires configured inside a sensing area for transmitting signals. Therefore, the manufacturing process is simplified, and the effective sensing area is not limited.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
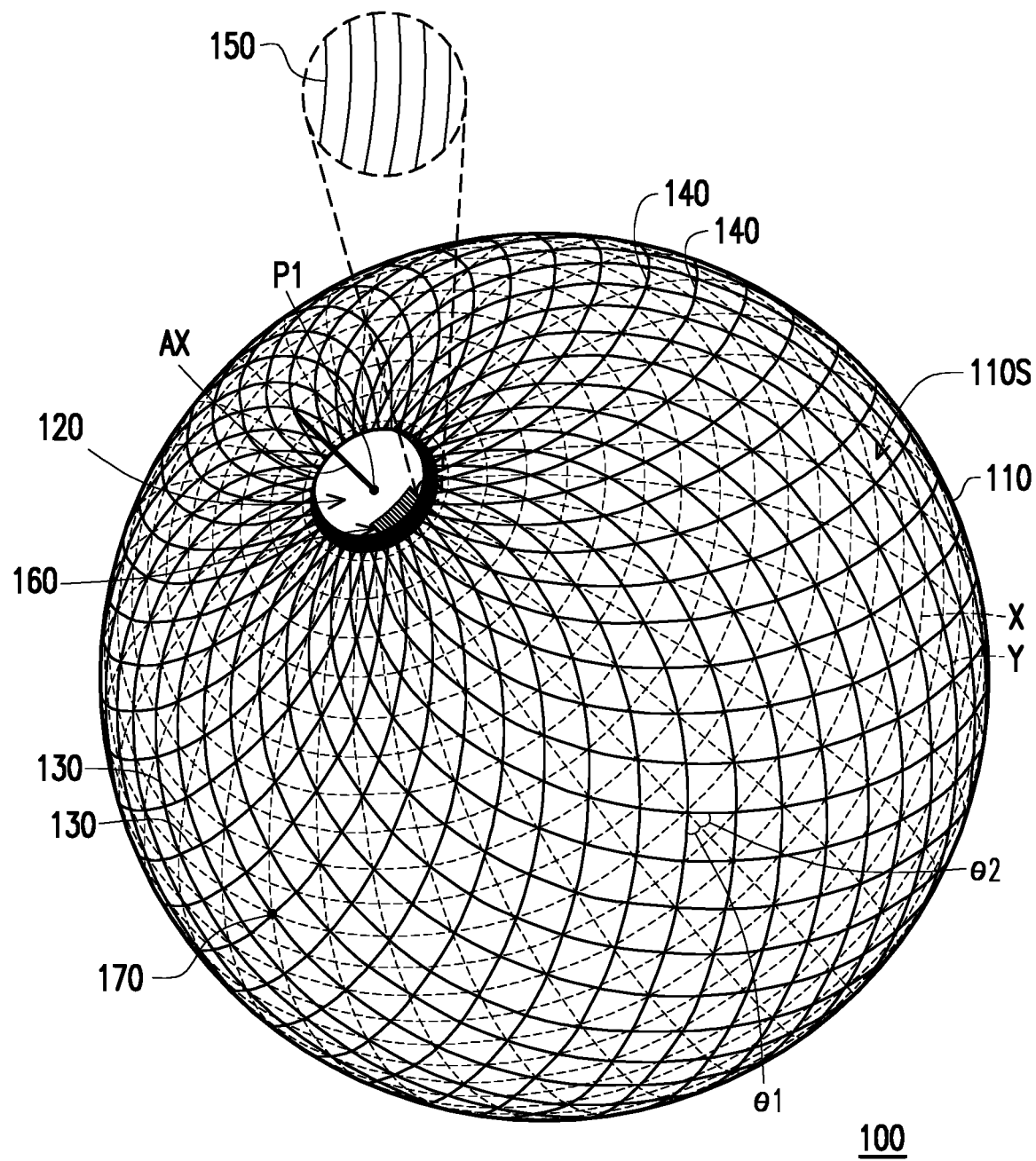
FIGS. 1A and 1B are a perspective view and a top view illustrating a stereoscopic touch panel 100 according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
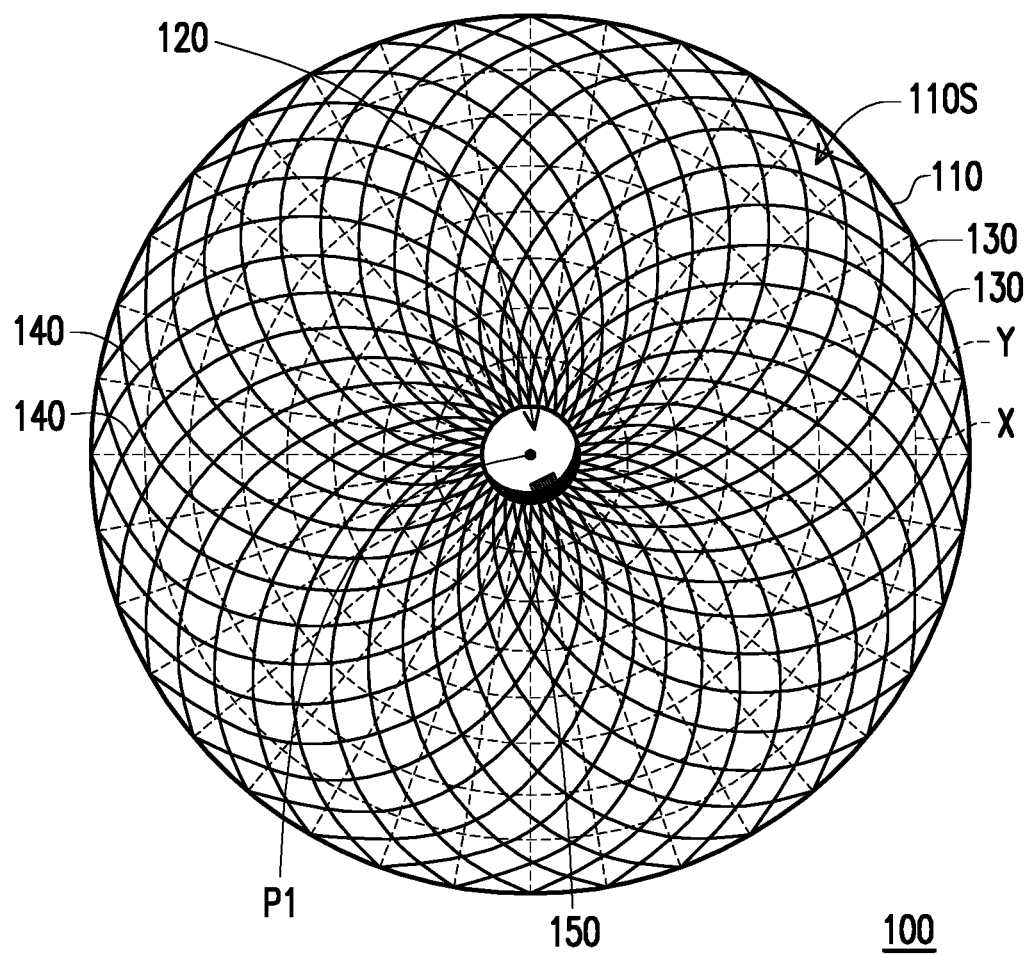

FIGS. 1A and 1B are a perspective view and a top view illustrating a stereoscopic touch panel 100 according to an embodiment of the invention. In FIGS. 1A and 1B, the stereoscopic touch panel 100 has a substrate 110, M dextrorotatory lines 130, N levorotatory lines 140, and bonding lead wires 150. The M dextrorotatory lines 130, the N levorotatory lines 140, and the bonding lead wires 150 are arranged on the substrate 110. An intersecting point 170 where each of the dextrorotatory lines 130 intersects any of the levorotatory lines 140 may be considered as a sensor.

The dextrorotatory lines 130 and the levorotatory lines 140 are arranged in accordance with a spherical surface 110S of the substrate 110. In the embodiment, terminals of the dextrorotatory lines 130 and the levorotatory lines 140 are collectively arranged in a non-operation region 120. The bonding lead wires 150 are disposed in the non-operation region 120 and are respectively connected to the dextrorotatory lines 130 and the levorotatory lines 140. The amount of the bonding lead wires 150 may be N+M. Accordingly, each of the bonding lead wires 150 is connected to one of the dextrorotatory lines 130 and the levorotatory lines 140 in a one-to-one manner. The bonding lead wires 150 are adapted to connect the dextrorotatory lines 130 and the levorotatory lines 140 to a driving circuit device (not shown). Alternatively, a circuit board (not shown) where the driving circuit device is disposed may be bonded to a bonding region 160 of the non-operation region 120 to be electrically connected with the dextrorotatory lines 130 and the levorotatory lines 140 via the bonding lead wires 150. The dextrorotatory lines 130 and the levorotatory lines 140 are distributed on the spherical surface 110S excluding the non-operation region 120. Therefore, lead wires disposed inside a sensing area (operation region) for transmitting signals are not required in the stereoscopic touch panel 100. Consequently, the manufacturing process is simplified, and the effective sensing area is not limited.

The substrate 110 may function as a display panel or other apparatuses, and may be structured as a spherical structure. The substrate 110 may be formed as a complete spherical structure or formed by a portion of a spherical structure. In addition, the substrate 110 has the spherical surface 110S. In some embodiments, the substrate 110 may be a hollow spherical structure. However, in some other embodiments, the substrate 110 may selectively be a solid spherical structure. From the top view (i.e., FIG. 1B), the spherical surface 110 may exhibit a profile similar to a circle. However, the profile of the spherical surface 110S may also be similar to an ellipse. In the embodiment, the spherical surface 110S includes the non-operation surface 120, and a polar axis AX passes through the non-operation region 120 to define a pole P1. Here, the polar axis AX may be a virtual axial line passing through a spherical center of the spherical structure of the substrate 110, instead of a physical axial line.

In general, to describe the location of a point (or a region) on the spherical surface 110S, a parallel X and a meridian Y may be defined on the spherical surface 110S based on the polar axis AX. The parallel X generally represents a line where a surface whose normal line is the polar axis AX intersects the spherical surface 110S, and the meridian Y generally represents a line where a surface parallel to and passing through the polar axis AX intersects the spherical surface 110S. From a top view, the meridian Y of the spherical surface 110S is a straight line radially extending from the pole P1, and the parallel X of the spherical surface 110S is a circle whose center is the pole P1. In the following, the arrangement of the dextrorotatory lines 130 and the levorotatory lines 140 will be described by using the meridian Y and the parallel X of the spherical surface 110S as reference lines.

Each of the dextrorotatory lines 130 extends from the non-operation region 120 in a direction leaving the pole P1 and rotates a dextrorotatory angle $\theta_1$ with respect to the meridian Y of the spherical surface 110S. In other words, the dextrorotatory angle $\theta_1$ is included between each of the dextrorotatory lines 130 and the meridian Y intersecting the dextrorotatory line 130. In the embodiment, the amount of the dextrorotatory lines 130 is M, and each of the dextrorotatory lines 130 is deviated a longitude of $(2\pi)/M$ degrees with respect to the adjacent dextrorotatory line 130, wherein M is a positive integer greater than 1. Therefore, the dextrorotatory lines 130 are substantially arranged on the spherical surface 110S at equidistant intervals. For example, if the intervals of the dextrorotatory lines 130 are measured along a single parallel X, the interval between any two adjacent dextrorotatory lines 130 may be constant.

Each of the levorotatory lines 140 extends from the non-operation region 120 in a direction leaving the pole P1 and rotates a levorotatory angle $\theta_2$ with respect to the meridian Y of the spherical surface 110S. In other words, the levorotatory angle $\theta_2$ is included between each of the levorotatory lines 140 and the meridian Y intersecting the levorotatory line 140. In the embodiment, the amount of the levorotatory lines 140 is M, and each of the levorotatory lines 140 is deviated a longitude of $(2\pi)/N$ degrees with respect to the adjacent levorotatory line 140, wherein N is a positive integer greater than 1. Therefore, the dextrorotatory lines 140 are substantially arranged on the spherical surface 110S at equidistant intervals.

The number M of the dextrorotatory lines 130 and the number N of the levorotatory lines 140 are greater than 1, and the maximums of the number M of the dextrorotatory lines 130 and the number N of the levorotatory lines 140 are determined based on a driving capability of the driving circuit device and a sensing capability of the sensor. According to an embodiment of the invention, N and M may respectively and independently range from 18 to 72. Alternatively, N and M may respectively and independently range from 18 to 54. According to an embodiment of the invention, a total of the number M of the dextrorotatory lines 130 and the number N of the levorotatory lines 140 ranges between 100 and 200. The values of M and N may be greater when the size of the stereoscopic touch panel is greater and/or the touch sensing resolution requirement is higher. However, the invention is not limited thereto. M may be equal to N. Nevertheless, the invention is not limited thereto, either. In the embodiment, the numbers of the levorotatory lines 140 and the dextrorotatory lines 130 are respectively 36. Therefore, each of the dextrorotatory lines 130 is deviated a longitude of 10 degrees with respect to the adjacent dextrorotatory line 130, and each of the levorotatory lines 140 is deviated a longitude of 10 degrees with respect to the adjacent dextrorotatory line 140. The dextrorotatory angle $\theta_1$ of the dextrorotatory line 130 and the levorotatory angle $\theta_2$ of the levorotatory line 140 may independently and respectively range from 5 degrees to 85 degrees. Alternatively, the dextrorotatory angle $\theta_1$ of the dextrorotatory line 130 and the levorotatory angle $\theta_2$ of the levorotatory line 140 may independently and respectively range from 5 degrees to 60 degrees. As yet another alternative embodiment, the dextrorotatory angle $\theta_1$ of the dextrorotatory line 130 and the levorotatory angle $\theta_2$ of the levorotatory line 140 may independently and respectively range from 5 degrees to 45 degrees. In addition, $\theta_1$ may be equal to $\theta_2$. Nevertheless, the dextrorotatory angle $\theta_1$ of the dextrorotatory line 130 and the levorotatory angle $\theta_2$ of the levorotatory line 140 may be respectively determined based on the values of M and N.

The number of the intersecting point 170 where each of the dextrorotatory lines 130 intersects any of the levorotatory lines 140 is less than or equal to 1. In other words, if one of the dextrorotatory lines 130 intersects one of the levorotatory lines 140, said dextrorotatory line 130 may only intersect said levorotatory line 140 at one single intersecting point 170. Regarding the meridian Y passing through one of the intersecting points 170, the dextrorotatory angle $\theta_1$ is included between the corresponding dextrorotatory line 130 and the meridian Y, the levorotatory angle $\theta_2$ is included between the corresponding levorotatory line 140 and the meridian Y, and the dextrorotatory angle $\theta_1$ is equal to the levorotatory angle $\theta_2$. In other words, the meridian Y may serve as an angle bisector of the dextrorotatory line 130 and the levorotatory line 140 at the intersecting point 170.

Figure 2:
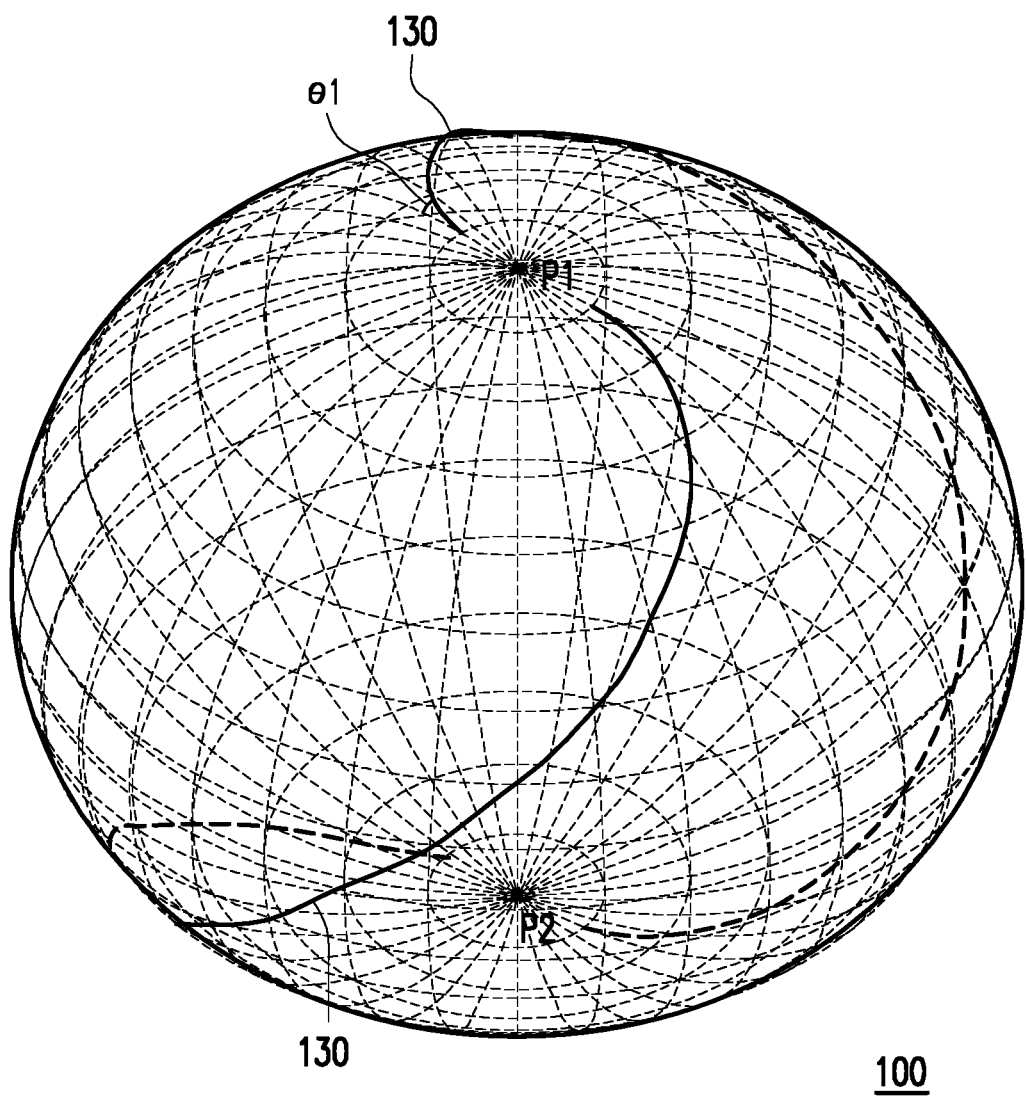
FIG. 2 is a schematic view illustrating two dextrorotatory lines 130 of a stereoscopic touch panel 100 according to an embodiment of the invention.

FIG. 2 is a schematic perspective view illustrating the stereoscopic touch panel 100 according to an embodiment of the invention. To clearly illustrate the wiring layout, only two dextrorotatory lines 130 are shown in FIG. 2. The two dextrorotatory lines 130 are spaced apart by a longitude of 180 degrees, and each of the dextrorotatory lines 130 extends from the non-operation region 120 to a vicinity of an opposite pole P2 of the spherical surface 110S in a direction leaving the pole P1 and rotates the dextrorotatory angle $\theta1$ with respect to the meridian direction of the spherical surface 110S. A range of the longitude that each of the dextrorotatory lines 130 extends on the spherical surface 110S is less than or equal to 180 degrees. Similarly, the layout of the respective levorotatory lines 140 on the spherical surface 110S in FIGS. 1A and 1B may be similar to the layout of the dextrorotatory lines 130 shown in FIG. 2, except for a different deviating direction with respect to the meridian. For example, a range of the longitude that each of the levorotatory lines 140 extends is less than or equal to 180 degrees, and each of the levorotatory lines 140 extends from the non-operation region 120 to a vicinity of the opposite pole P2 of the spherical surface 110S in a direction leaving the pole P1 and rotates the levorotatory angle $\theta_2$ with respect to the meridian direction of the spherical surface 110S.

Figure 3:
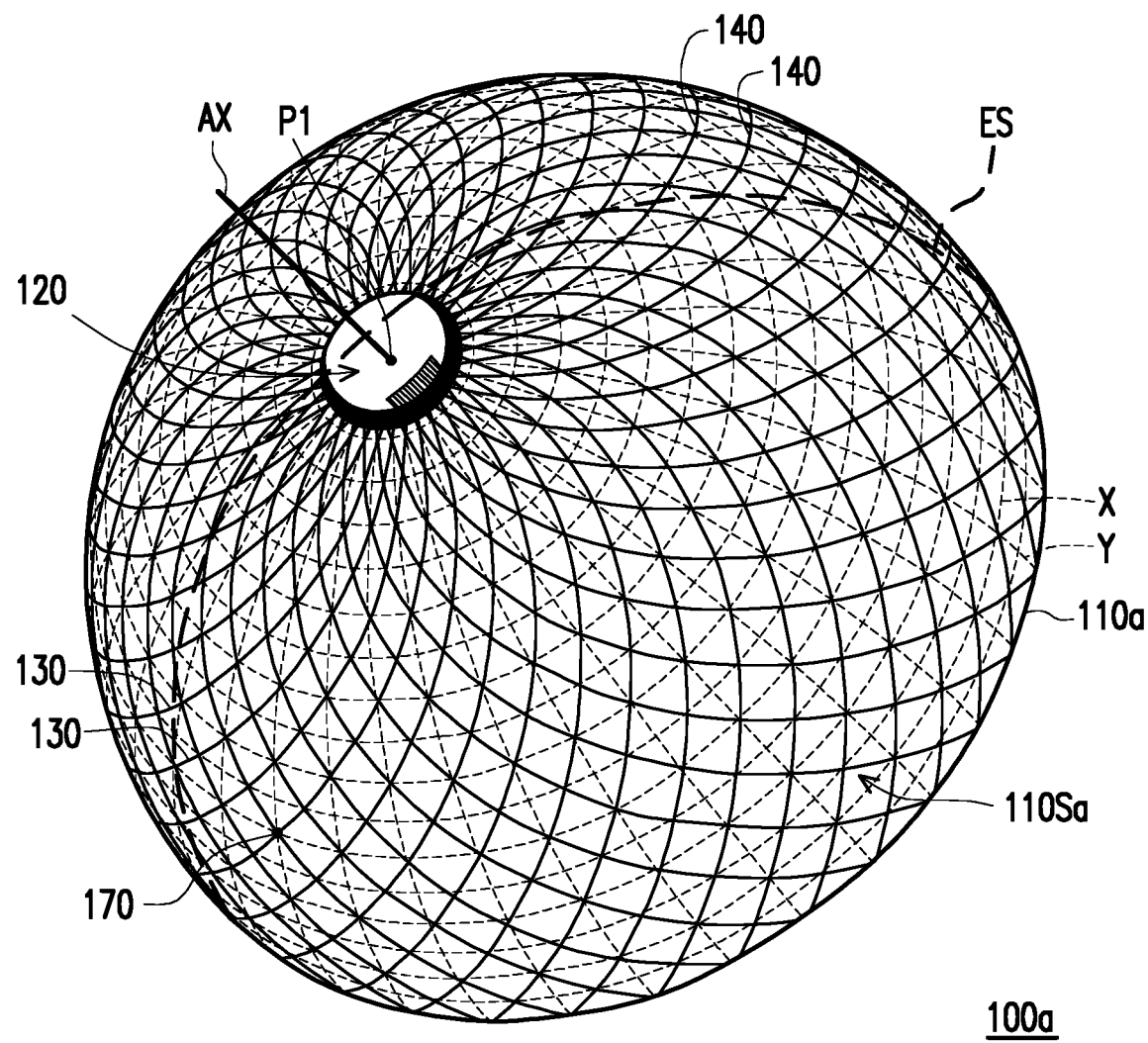
FIG. 3 is a perspective view illustrating a stereoscopic touch panel 100a according to an embodiment of the invention.

FIG. 3 is an inclined view illustrating a touch panel 100a according to another embodiment of the invention. The touch panel 100a includes a semi-spherical substrate 110a, the dextrorotatory lines 130, and the levorotatory lines 140. The semi-spherical substrate 110a includes a semi-spherical surface 100Sa and a surface (e.g., a flat surface) defined by an edge contour ES of the semi-spherical surface 100Sa. In the embodiment, the polar axis AX may pass through the surface defined by the edge contour ES of the semispherical surface 110Sa. The dextrorotatory lines 130 and the levorotatory lines 140 are arranged on the semi-spherical surface 110Sa in a layout similar to that in the previous embodiment. However, a range of the longitude that each of the dextrorotatory lines 130 and the levorotatory lines 140 extends across on the semi-spherical surface 110Sa is less than 180 degrees. As shown, the number of the intersecting point 170 where each of the levorotatory lines 140 intersects any of the dextrorotatory lines 130 is one or zero (i.e., no intersecting point).

Figure 4:
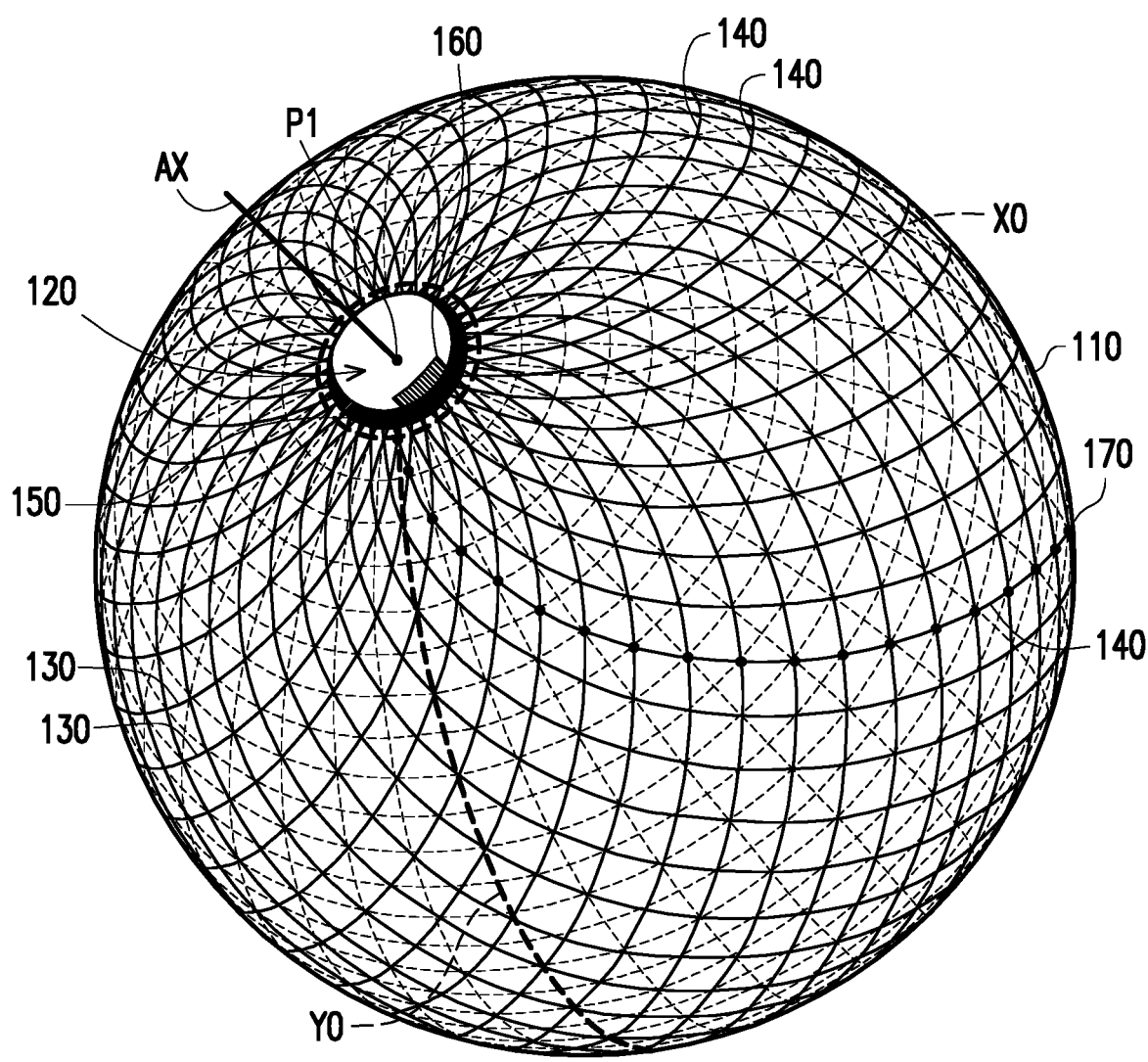
FIG. 4 is a view illustrating a touch sensing method according to an embodiment of the invention.

FIG. 4 is a view illustrating a touch sensing method according to an embodiment of the invention. The stereoscopic touch panel 100 (or 100a) is provided. A scan signal is sequentially applied to the dextrorotatory lines 130 or the levorotatory lines 140. When the scan signal is applied to the dextrorotatory lines 130, all the levorotatory lines 140 are configured to read a sensing signal. Alternatively, when the scan signal is applied to the levorotatory lines 140, all the dextrorotatory lines 130 are configured to read the sensing signal. In the touch sensing method according to the embodiment, when the scan signal is input to one of the dextrorotatory lines 130, each of the levorotatory lines 140 is configured to read the sensing signal. Similarly, when the scan signal is input to one of the levorotatory lines 140, each of the dextrorotatory lines 130 is configured to read the sensing signal. FIG. 4 is a schematic view illustrating the intersecting point 170 sensed when one of the levorotatory lines 140 is scanned and all the dextrorotatory lines 130 read the sensing signal.

Taking the touch panel 100 as an example, when the number M of the dextrorotatory lines 130 and the number N of the levorotatory lines 140 are both 36 and each of the dextrorotatory lines 130 intersects the 36 levorotatory lines 140, when the scan signal is input to each of the dextrorotatory lines 130, signals at the 36 intersecting points 170 may be read by the 36 levorotatory lines 140. By carrying out such a scanning process for 36 times (i.e., sequentially scanning from the $0^{th}$ dextrorotatory line 130 to the $35^{th}$ dextrorotatory line 130), sensing at all the intersecting points 170 on the whole touch panel 100 is completed. Alternatively, if sensing is carried out by scanning the levorotatory lines 140, sensing at all the intersecting points 170 on the whole touch panel 100 may also be completed by carrying out the scanning process for 36 times. Therefore, in the embodiment, the sensing of N*M intersecting points 170 may be carried out by a simple touch sensing method. For example, according to the touch sensing method of the embodiment, the sensing at N*M intersecting points 170 may be completed by carrying out the scanning process for N times (or M times).

In the embodiment, each of the dextrorotatory lines 130 intersects any one of the levorotatory lines 140 at at most one intersecting point 170. When a touch event occurs at multiple intersecting points 170 simultaneously, the intersecting points 170 touched simultaneously may be detected through signals on different dextrorotatory lines 130 and levorotatory lines 140. Therefore, the touch sensing method according to the embodiment is capable of multi-point touch sensing without inducing a sensing error (e.g. ghost point).

Figure 5:
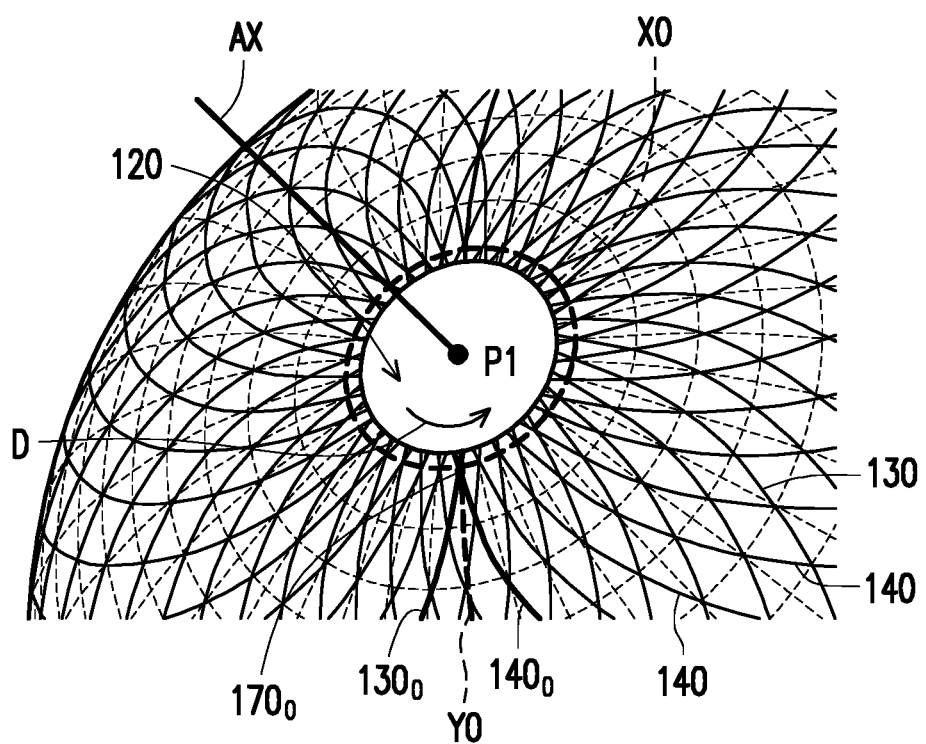
FIG. 5 is a view illustrating a numbering convention of dextrorotatory lines and levorotatory lines of a stereoscopic touch panel according to an embodiment of the invention.

Referring to FIG. 5, FIG. 5 illustrates how dextrorotatory lines and levorotatory lines of a stereoscopic touch panel are numbered and how coordinates of the intersecting points are calculated according to an embodiment of the invention. To define the coordinates of the respective intersecting points 170, a parallel where intersecting points 170 closest to the non-operation region 120 in the intersecting points 170 of the levorotatory lines 140 and the dextrorotatory lines 130 are located may be defined as a starting parallel X0. One of the dextrorotatory lines 130 is chosen as a $0^{th}$ dextrorotatory line $130_0$, and all the dextrorotatory lines 130 are sequentially numbered in a predetermined direction D (the embodiment adopts a counterclockwise direction or a levorotatory direction as an example) from the $0^{th}$ dextrorotatory line $130_0$. One of the levorotatory lines 140 intersecting the $0^{th}$ dextrorotatory line $130_0$ at the starting parallel X0 is chosen as a $0^{th}$ levorotatory line $140_0$, and all the levorotatory lines 140 are sequentially numbered in the predetermined direction D from the $0^{th}$ levorotatory line $140_0$. In addition, a longitude of a meridian Y0 passing through the $0^{th}$ dextrorotatory line $130_0$ and the $0^{th}$ levorotatory line $140_0$ is set as 0 degrees, and the longitude is set to increase along the predetermined direction D. Under the circumstance, when it is sensed that a position where a touch even occurs is at the intersecting point 170 where the $m^{th}$ dextrorotatory line 130 intersects the $n^{th}$ levorotatory line 140, a longitude coordinate of the intersecting point 170 where the $m^{th}$ dextrorotatory line 130 intersects the $n^{th}$ levorotatory line 140 is $MOD((m+n+a)/Q,2)*\pi$, and a latitude coordinate of the intersecting point 170 where the $m^{th}$ dextrorotatory line 130 intersects the $n^{th}$ levorotatory line 140 is $MOD((m-n+Q)/Q,1)*\pi+\Delta 1st$, wherein when $0 \leq m < n$, $a = Q$;
when $n \leq m \leq Q-1$, $a = 0$;
m ranges from 1 to M;
n ranges from 1 to N;
$\Delta 1st$ is an included angle between a radius of an arbitrary point on the starting parallel X0 and the polar axis Ax, and Q is M or N.

MOD(Exp1, Exp2) is a surplus function, where the former expression (Exp1) is considered as the dividend, the latter expression (Exp2) is considered as a divisor, and a remainder after a dividing operation using the two expressions is obtained. Taking an example where the included angle between the radius of an arbitrary point on the starting parallel X0 and the polar axis AX is 10 degrees, when the position where a touch event occurs is the intersecting point 170 where the $15^{th}$ dextrorotatory line 130 intersects the $18^{th}$ levorotatory line 140, it is obtained through calculation based on the above formula that a is 36 and the coordinate of the touch point is (345, 175). When the position where a touch event occurs is the intersecting point 170 where the $27^{th}$ dextrorotatory line 130 intersects the $33^{th}$ levorotatory line 140, it is obtained through calculation based on the above formula that a is 36 and the coordinate of the touch point is (120, 160). When the position where a touch event occurs is the intersecting point 170 where the $35^{th}$ dextrorotatory line 130 intersects the $0^{th}$ levorotatory line 140, it is obtained through calculation based on the above formula that a is 0 and the coordinate of the touch point is (175, 175). When the position where a touch event occurs is the intersecting point 170 where the $35^{th}$ dextrorotatory line 130 intersects the $1^{th}$ levorotatory line 140, it is obtained through calculation based on the above formula that a is 0 and the coordinate of the touch point is (180, 180). When the position where a touch event occurs is the intersecting point 170 where the $27^{th}$ dextrorotatory line 130 intersects the $0^{th}$ levorotatory line 140, it is obtained through calculation based on the above formula that a is 0 and the coordinate of the touch point is (135, 145). The formula above merely serves as a way to calculate the coordinates in the touch sensing method of the embodiment, and the invention shall not be construed as being limited thereto. In other embodiments, the coordinates of the respective intersecting points 170 may be stored as a table. When a touch event occurs, the coordinate of the touch position may be found out by looking up the table without calculation based on the formula.

In view of the foregoing, in the stereoscopic touch panel according to the embodiments of the invention, the layout with the levorotatory lines and the dextrorotatory lines is adopted to implement wires for touch sensing. Hence, touch sensing, particularly multi-point touch sensing, is achieved through a simple touch sensing method. Besides, in the stereoscopic touch panel according to the embodiments of the invention, it is not necessary to sacrifice the layout space of sensing wires in order to transmit signals. Besides, it is not necessary to dispose lead wires inside the sensing area to transmit signals. Therefore, the manufacturing process is simplified, the effective sensing area is not limited, and the usefulness of the stereoscopic touch panel is facilitated.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A stereoscopic touch panel, comprising:
   a substrate, having a spherical surface, wherein the spherical surface comprises a non-operation region, and a polar axis of the spherical surface passes through the non-operation region to define a pole;
   M dextrorotatory lines, disposed on the spherical surface, wherein each of the dextrorotatory lines extends from the non-operation region in a direction leaving the pole and rotates a dextrorotatory angle with respect to a meridian direction of the spherical surface, and each of the dextrorotatory lines is deviated a longitude of $(2\pi/M)$ degrees with respect to an adjacent dextrorotatory line, wherein M is a positive integer greater than 1; and
   N levorotatory lines, disposed on the spherical surface, wherein each of the levorotatory lines extends from the non-operation region in the direction leaving the pole and rotates a levorotatory angle with respect to the meridian direction of the spherical surface, and each of the levorotatory lines is deviated a longitude of $(2\pi)/N$ degrees with respect to an adjacent levorotatory line, wherein N is a positive integer greater than 1.

2. The stereoscopic touch panel as claimed in claim 1, wherein a range of a longitude that each of the dextrorotatory lines extends on the spherical surface is less than or equal to 180 degrees.

3. The stereoscopic touch panel as claimed in claim 1, wherein a range of a longitude that each of the levorotatory lines extends on the spherical surface is less than or equal to 180 degrees.

4. The stereoscopic touch panel as claimed in claim 1, wherein an amount of an intersecting point where each of the levorotatory lines intersects any of the dextrorotatory lines is less than or equal to 1.

5. The stereoscopic touch panel as claimed in claim 1, wherein:
   regarding a meridian passing through an intersecting point where one of the dextrorotatory lines intersects one of the levorotatory lines, a dextrorotatory angle of the one of the dextrorotatory lines with respect to the meridian is equal to a levorotatory angle of the one of the levorotatory lines with respect to the meridian.

6. The stereoscopic touch panel as claimed in claim 1, wherein N is equal to M.

7. The stereoscopic touch panel as claimed in claim 1, wherein the spherical surface is a surface of a complete sphere.

8. The stereoscopic touch panel as claimed in claim 7, wherein each of the levorotatory lines intersects all the dextrorotatory lines, and each of the levorotatory lines has a single intersecting point with each of the dextrorotatory lines.

9. The stereoscopic touch panel as claimed in claim 1, wherein the spherical surface is a surface of a portion of a sphere.

10. The stereoscopic touch panel as claimed in claim 9, wherein each of the levorotatory lines intersects less than M of the dextrorotatory lines.

11. The stereoscopic touch panel as claimed in claim 9, wherein the polar axis passes through a surface defined by an edge contour of the surface of the portion of the sphere.

12. The stereoscopic touch panel as claimed in claim 1, wherein among a plurality of intersecting points where the levorotatory lines intersect the dextrorotatory lines, intersecting points closest to the non-operation region are located on a starting parallel.

13. The stereoscopic touch panel as claimed in claim 12, wherein:
   one of the dextrorotatory lines is chosen as a $0^{th}$ dextrorotatory line, and the dextrorotatory lines are sequentially numbered from the $0^{th}$ dextrorotatory line in a predetermined direction,
   one of the levorotatory lines intersecting the $0^{th}$ dextrorotatory line at the starting parallel is chosen as a $0_{th}$ levorotatory line and the levorotatory lines are sequentially numbered from the $0^{th}$ levorotatory line in the predetermined direction, and
   when a longitude passing through an intersecting point where the $0^{th}$ dextrorotatory line intersects the $0^{th}$ levorotatory line is set as 0 degrees, and the longitude increases along the predetermined direction,
   a longitude coordinate of an intersecting point where a $m^{th}$ dextrorotatory line intersects a $n^{th}$ levorotatory line is $MOD((m+n+a)/Q,2)*\pi$, and a latitude coordinate of the intersecting point is $MOD((m-n+Q)/Q,1)*\pi+\Delta 1st$, wherein:
   when $0 \le m < n$, $a=Q$;
   when $n \le m \le Q-1$, $a=0$;
   m ranges from 1 to M;
   n ranges from 1 to N;
   $\Delta 1st$ is an included angle between a radius of an arbitrary point on the starting parallel and the polar axis, and
   Q is M or N.

14. The stereoscopic touch panel as claimed in claim 13, wherein the predetermined direction is a counterclockwise direction.

15. The stereoscopic touch panel as claimed in claim 1, further comprising a plurality of bonding lead wires in the non-operation region, wherein the bonding lead wires are respectively connected with the dextrorotatory lines and the levorotatory lines, and the bonding lead wires are collectively arranged in a bonding region in the non-operation region to be electrically connected with a driving circuit device.

16. A touch sensing method, comprising:
   providing the stereoscopic touch panel as claimed in claim 1, wherein among a plurality of intersecting points where the levorotatory lines intersect the dextrorotatory lines, intersecting points closest to the non-operation region are located on a starting parallel;
   sequentially applying a scan signal to the M dextrorotatory lines or the N levorotatory lines; and reading a sensing signal by all the levorotatory lines when the scan signal is applied to the dextrorotatory line, or reading the sensing signal by all the dextrorotatory lines when the scan signal is applied to the levorotatory line.

17. The touch sensing method as claimed in claim 16, wherein:
   one of the dextrorotatory lines is chosen as a $0^{th}$ dextrorotatory line, and the dextrorotatory lines are sequentially numbered from the $0^{th}$ dextrorotatory line in a predetermined direction,
   one of the levorotatory line intersecting the $0^{th}$ dextrorotatory line at the starting parallel is chosen as a $0_{th}$ levorotatory line and the levorotatory lines are sequentially numbered from the $0^{th}$ levorotatory line in the predetermined direction, and
   when a longitude passing through an intersecting point where the $0^{th}$ dextrorotatory line intersects the $0^{th}$ levorotatory line is set as 0 degrees, and the longitude increases along the predetermined direction, under a circumstance when one of the $m^{th}$ dextrorotatory line and the $n^{th}$ levorotatory line is applied with the scan signal and a sensing signal of being touched is read from the other of the $m^{th}$ dextrorotatory line and the $n^{th}$ levorotatory line, a longitude coordinate of a touch point is $MOD((m+n+a)/Q,2)*\pi$, and a latitude coordinate of the touch point is $MOD((m-n+Q)/Q,1)*\pi+\Delta 1st$, wherein:

when $0 \leq m < n$, $a=Q$;
when $n \leq m \leq Q-1$, $a=0$;
m ranges from 1 to M;
n ranges from 1 to N;
$\Delta 1st$ is an included angle of the spherical surface between a radius of an arbitrary point on the starting parallel and the polar axis, and
Q is M or N.

* * * * *